United States Patent Office 3,437,454
Patented Apr. 8, 1969

3,437,454
VANADIUM RECOVERY FROM WET PROCESS PHOSPHORIC ACID USING ALPHA-HYDROXY OXIMES
Merle N. Shaw, Soda Springs, Idaho, assignor to Kerr-McGee Corporation, a corporation of Delaware
No Drawing. Filed Apr. 26, 1966, Ser. No. 545,302
Int. Cl. B01j *9/22;* C01g *31/00*
U.S. Cl. 23—312
9 Claims This invention relates to the recovery of vanadium from acid solutions, and more particularly relates to recovery of vanadium from wet process phosphoric acid by solvent extraction.

Phosphoric acid is generally produced commercially by one of two methods. One method is generally called the "furnace" method, and the other is generally referred to as the "wet process" method. In the wet process method of producing phosphoric acid, phosphate rock is contacted with a mineral acid, such as sulfuric acid. Most phosphate rock contains metal compounds in varying amounts, and in many cases these metal compounds are dissolved from the phosphate rock and appear in the wet process acid as contaminants. Vanadium compounds are among those dissolved from the phosphate rock, particularly when the rock is from the so-called Western phosphate deposits of Idaho, Wyoming, Utah, and Montana.

Vanadium is a valuable material, and wet process phosphoric acid can be an important source of this material. The vanadium contributed nothing to the value of the acid, and in fact is an undesirable contaminant in the acid, as pointed out above. Therefore, a process for recovery of vanadium from wet process phosphoric acid provides an important benefit, in that the vanadium is converted from an undesirable contaminant to a valuable by-product.

There have been many attempts made in the past to recover vanadium from wet process phosphoric acid. One such process involves addition of a soluble ferrocyanide compound to the acid to precipitate the vanadium, as described more fully in U.S. Patent No. 1,544,911. Another such process involves extraction of the acid with an organic extractant for the vanadium. U.S. Patent No. 2,211,119 describes such a process in which the preferred organic extractant is isopropyl ether. While these prior art processes have been successful to some extent, there is a need for an improved process of recovering vanadium from wet process phosphoric acid.

In accordance with this invention, it has been discovered that vanadium can be recovered from wet process phosphoric acid by extraction of the acid at a pH of from 0.0 to 1.5 with an organic extractant comprising a hydrocarbon solvent and an α-hydroxy oxime. The vanadium values are preferentially extracted from the acid into the organic phase, and the loaded organic phase can then be easily separated from the wet process acid due to the immiscibility of the acid and the organic phase. The vanadium values can then be recovered from the organic phase, as for example by stripping with a suitable stripping solution such as a 10% solution of sodium carbonate. The vanadium may be precipitated from the stripping solution by conventional prior art methods.

Accordingly, it is an object of the present invention to provide an improved solvent extraction process for recovering vanadium from wet process phosphoric acid.

It is a further object to provide an improved process wherein an organic extractant comprising a hydrocarbon solvent and an α-hydroxy oxime is used to extract vanadium from wet process phosphoric acid.

The organic extractants of this invention may comprise from 70 to 98 percent, and preferably 85 to 95 percent, of a hydrocarbon such as kerosine, fuel oil, toluene, or any hydrocarbon solvent for the active extractive agent which is not too viscous or too volatile to present handling difficulties. The active extractive agents of this invention are α-hydroxy oximes having the following general formula:

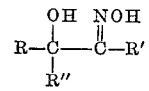

where R, R′ and R″ are organic hydrocarbon radicals such as alkyl, aryl or alkylaryl radicals. R″ may also be, and preferably is, hydrogen. Preferably, R and R′ are unsaturated hydrocarbons or branched chain alkyl groups containing from 6 to 20 carbon atoms. R and R′ are also preferably attached to the carbons substituted with the —OH and =NOH groups through a secondary carbon atom. When R″ is not hydrogen, it may be as described above for R and R′. Mixtures of compounds having the general formula as defined above may also be used. The organic extractant phase may contain small amounts, such as from 0.5 to 5 weight percent, of an aliphatic alcohol having 8 to 15 carbons, such as isodecanol, but the presence of these alcohols is not necessary, and may even be undesirable in some instances. These alcohols are sometimes used in similar extraction processes to improve phase separation characteristics, but no problems in phase separation have been encountered in the process of this invention even when the alcohols are not present in the organic phase.

In the treatment of wet process acid in accordance with this invention, the vanadium should be in the +5 valence state. This generally necessitates an oxidation step prior to contacting the acid with the organic extractant. Sodium chlorate or other suitable oxidant may be added to the wet process acid to provide the requisite oxidation. The wet process acid should be oxidized to an EMF of at least 800 millivolts (as measured with a standard calomel electrode), and preferably to an EMF of more than 1,000. An optimum degree of oxidation is about 1,060 ±20.

The term "wet process phosphoric acid" as used herein is intended to include a phosphoric acid solution produced by contacting phosphate rock with a mineral acid and separating the resulting acid solution from the insoluble residue. The wet process acid may contain from about 8 to 70 or more percent of phosphate expressed as $P_2O_5$, and will generally contain substantial amounts of dissolved iron, chloride, sulfate and other materials, as well as recoverable amounts of vanadium values.

In general, the extraction efficiency decreases as the temperature is increased, although in some instances it may not be practical to operate at ambient temperature conditions.

The amount of organic extractant phase to be used for most efficient extraction is from about 0.5 to 2.0 times the volume of wet process acid to be treated. A preferred volume ratio of aqueous to organic phase $(A/O)$ is 1.0. This ratio is preferred whether the extraction is performed on a batch basis, or on a continuous basis, such as in a continuous countercurrent single or multi-stage extraction. This ratio is preferred even though the amount of active agent in the organic phase is varied, such as from 3 to 15 or more percent. It has been found that at an $A/O$ ratio of 1.0 a batch extraction approaches equilibrium in about thirty seconds. The contact time in a continuous system will generally be considerably longer per stage, such as from several minutes to an hour or more. When the extraction is performed in accordance with the above preferred embodiment, the distribution ratio (D) will generally be at a minimum. (D) is defined as the ratio of vanadium in the aqueous phase to the vanadium in the organic phase, both expressed in equivalent terms, such as in grams per liter.

The foregoing description and the following specific examples are for purposes of illustration, and are not to be considered as limiting the scope of the invention, reference being had to the appended claims for this purpose.

Example I

A sample of wet process phosphoric acid from a commercial acid plant and having a pH of about 0.1 and a vanadium content, expressed as $V_2O_5$ of 1.68 grams per liter was oxidized with sodium chlorate and contacted with an equal volume of an organic phase comprising 92% kerosine, 3% isodecanol, and 5% of an α-hydroxy oxime as described hereinabove. The acid sample containing the extractant was agitated for three minutes and the two phases allowed to separate due to their immiscibility. The aqueous phase was found to contain 0.35 gram per liter of vanadium expressed as $V_2O_5$, indicating that 79% of the $V_2O_5$ was extracted. The vanadium loaded organic phase was stripped with one-tenth its volume of a 10% sodium carbonate solution to remove the extracted $V_2O_5$ from the loaded organic phase.

Example II

This example illustrates the variation in extraction efficiency with the degree of oxidation of the wet process acid. In this example several batches from the same sample of wet process phosphoric acid were oxidized to varying degrees, as indicated by a standard calomel electrode, by addition of sodium chlorate, and then contacted with an equal volume ($A/O=1$) of organic extractant phase containing an α-hydroxy oxime. The following Table I illustrates that an EMF of more than 800, and preferably more than 1,000, is needed for best results.

TABLE I

| V (aqueous phase) | V (organic phase) | EMF (vs. SCE) | D=V (aqueous)/ V (organic) |
|---|---|---|---|
| 0.91 | 0.03 | 450 | 30.0 |
| 0.81 | 0.13 | 850 | 6.14 |
| 0.68 | 0.26 | 930 | 2.60 |
| 0.25 | 0.69 | 1080 | 0.36 |

Example III

This example illustrates the variation in extraction efficiency, as expressed by D, or $$\frac{V(\text{aqueous})}{V(\text{organic})}$$

for different volume ratios of aqueous phase to organic phase ($A/O$). In this example several batches of the same acid sample were oxidized to an EMF of 1015 by addition of 0.75 gram of sodium chlorate per gram of $V_2O_5$ and then contacted with different volumes of organic extractant comprising 93% kerosine, 2% isodecanol and 5% α-hydroxy oxime at 25° C. The results are expressed in the following Table II.

TABLE II

| A/O | Aqueous | Organic | D=$V_2O_5$(A)/ $V_2O_5$(O) |
|---|---|---|---|
| 0.1 | 0.32 | 0.10 | 3.20 |
| 0.2 | 0.43 | 0.18 | 2.38 |
| 0.33 | 0.41 | 0.31 | 1.32 |
| 0.5 | 0.33 | 0.50 | 0.66 |
| 1.0 | 0.34 | 1.00 | 0.34 |
| 2.0 | 0.78 | 1.12 | 0.70 |
| 3.0 | 0.97 | 1.11 | 0.87 |

Example IV

This example illustrates the decrease in extraction efficiency, expressed as D, with increase in contact temperature. In this example identical samples of wet process acid at an EMF of 870 were contacted with equal volumes of the same organic extractant at different temperatures. The results are shown in the following Table III.

TABLE III

| $V_2O_5$ (aqueous) | $V_2O_5$ (organic) | Temperature, °F. | D |
|---|---|---|---|
| 1.18 | 0.50 | 160 | 2.36 |
| 0.93 | 0.73 | 75 | 1.27 |

What is claimed is:
1. A process for recovery of vanadium values from wet process phosphoric acid containing the same comprising:
   (a) contacting said wet process phosphoric acid at a pH of from 0.0 to 1.5 with an organic extractant phase comprising a liquid hydrocarbon and an α-hydroxy oxime to extract at least a portion of said vanadium values into said organic extractant phase, said α-hydroxy oxime having the formula:

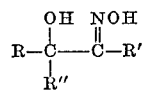

in which R and R' are organic hydrocarbon radicals selected from the group consisting of alkyl, aryl and alkylaryl radicals and R" is selected from the group consisting of hydrogen and alkyl, aryl, and alkylaryl radicals; and
   (b) recovering the vanadium-containing organic phase.
2. The process as defined in claim 1 wherein the volume of said organic phase is from 0.5 to 2.0 times the volume of the wet process phosphoric acid.
3. The process as defined in claim 1 wherein the volume of said organic phase is approximately equal to the volume of the wet process phosphoric acid.
4. The process as defined in claim 1 wherein the EMF of the acid phase is at least 800 millivolts as measured by a standard calomel electrode.
5. The process of claim 1 wherein the EMF of the acid phase is between 1040 and 1080 millivolts as measured by a standard calomel electrode.
6. The process as defined in claim 1 wherein said organic phase contains from three to 18 percent of said α-hydroxy oxime.
7. The process as defined in claim 1 wherein said liquid hydrocarbon in the organic phase is kerosine.
8. The process as defined in claim 1 wherein said wet process phosphoric acid is contacted countercurrently in a continuous multi-stage extraction operation by said organic extractant phase.
9. The process as defined in claim 1 wherein vanadium values are recovered from said vanadium-containing organic phase by stripping with a 10 percent solution of sodium carbonate in water.

References Cited

UNITED STATES PATENTS

| 3,088,799 | 3/1963 | Fetscher | 23—312 |
| 3,197,274 | 7/1965 | White | 23—340 |
| 3,206,277 | 9/1965 | Burwell | 23—312 X |
| 3,284,501 | 11/1966 | Swanson | 260—566 |
| 3,294,842 | 12/1966 | Swanson | 260—566 |
| 3,310,374 | 3/1967 | Posey | 23—312 X |
| 3,359,314 | 12/1967 | Brichta | 260—566 |
| 3,367,749 | 2/1968 | Koerner | 23—312 |
| 3,375,068 | 3/1968 | Frohlich | 23—165 |

NORMAN YUDKOFF, *Primary Examiner.*

S. J. EMERY, *Assistant Examiner.*

U.S. Cl. X.R.

23—51, 165, 340; 260—566